UNITED STATES PATENT OFFICE.

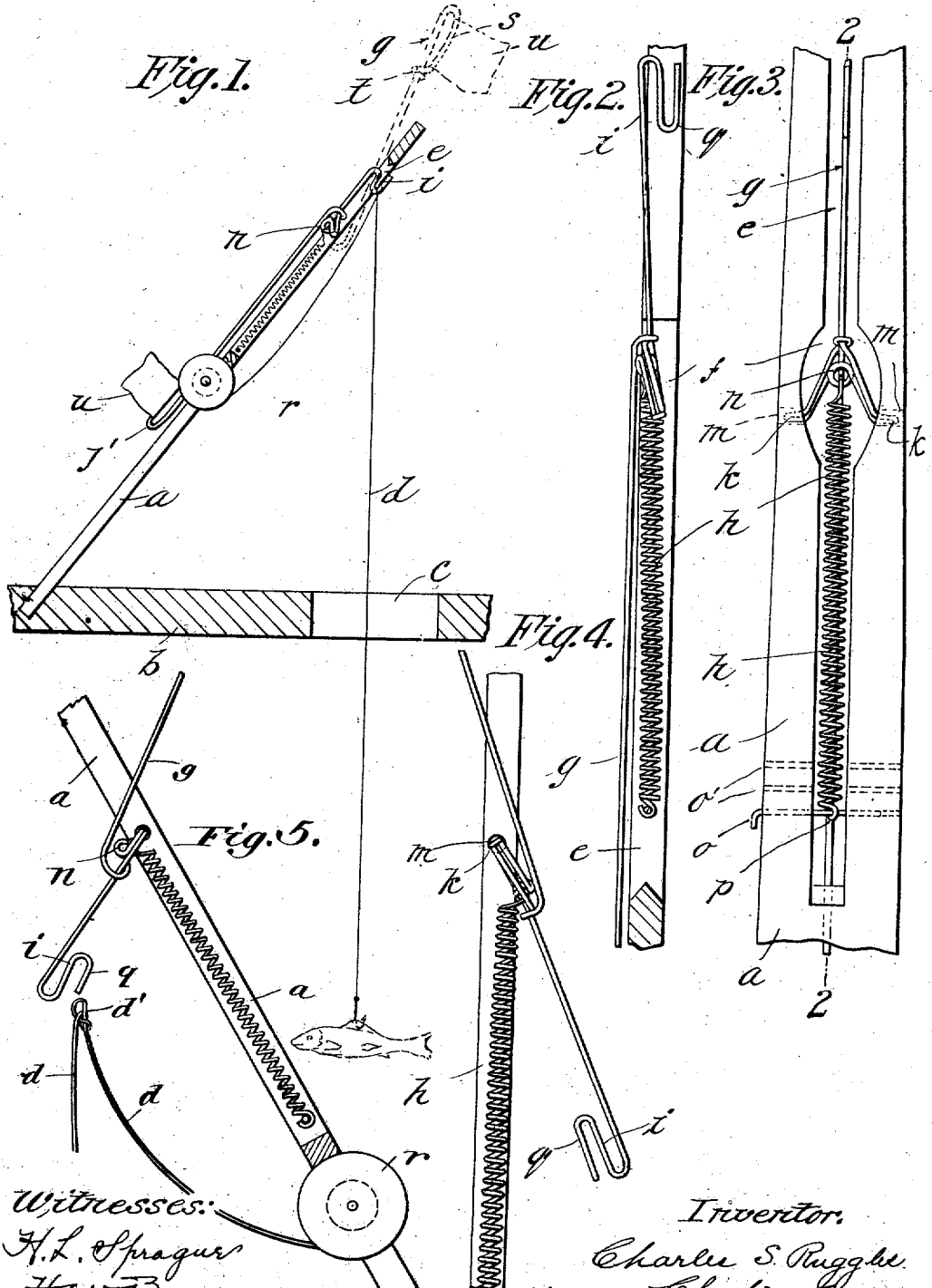

CHARLES S. RUGGLES, OF THREE RIVERS, MASSACHUSETTS.

FISHERMAN'S TYPE.

No. 880,045.     Specification of Letters Patent.     Patented Feb. 25, 1908.

Application filed March 12, 1907. Serial No. 361,939.

*To all whom it may concern:*

Be it known that I, CHARLES S. RUGGLES, a citizen of the United States of America, residing at Three Rivers, in the county of Hampden and State of Massachusetts, have invented new and useful Improvements in Fishermen's Type, of which the following is a specification.

The present invention relates to improvements in fishing apparatus, and what is commonly known in the trade as "fishermen's type", in which elastic means is provided for normally maintaining the flag or signal holder in an inverted position, and also normally maintaining the line in a looped condition on the inverted end of the signal holder, whereby when the holder is inverted by overcoming the tension of the elastic means, the line will be freed from the loop and permitted to pay out, as will be fully described. At the end of this interval the line is automatically released so that the coiled up surplus part of the line can be easily drawn out.

Broadly, the invention consists in pivotally mounting the signal wire in a rigid support so that the same can readily assume the position in which the flag end of the signal wire is normally in a downturned position, and by a slight pull on the opposite end of the wire will be thrown into an upright or signal position. The means for moving the signal wire into these two positions is preferably an elastic element,—one end of which is secured to the signal wire outside of its center of rotation and the other end of which is attached to the rigid support, whereby the wire will be securely held in either an elevated or lowered position.

In the drawings forming part of this application,—Figure 1 is a side elevation of my improvement showing the standard secured in an inclined position in the ice, and with the signal wire in dotted and full line position; also the bait end of the line looped to the signal wire and supporting the bait. Fig. 2 is a longitudinal sectional elevation on the line 2—2 of Fig. 3, the signal wire being shown in the same position as indicated in Fig. 1. Fig. 3 is a front elevation of the device as shown in Fig. 1 looking from the left-hand side of the sheet. Fig. 4 shows the position of the spring and signal wire after being tripped. Fig. 5 shows, on an enlarged scale, the position of the parts after the flag-holder has been rotated to elevate the flag.

Referring to these drawings in detail, $a$ designates the standard or rigid support which may be constructed of any suitable material, as wood or metal,—the lower end of the same being adapted to be secured in an inclined position to a suitable rigid support, and, as shown in Fig. 1, is embedded in the ice (designated at $b$,) through which an opening $c$ has been cut for the bait end of the line $d$. The standard $a$ is provided with a longitudinal slot or opening $e$ having an enlarged portion $f$.

Rotatably mounted within the slot $e$ is the flag or signal holder $g$, and the spring $h$ for controlling and maintaining the position of the flag-holder in either an elevated or lowered position. The flag-holder is provided at one end with a hook-shaped or double curved portion $i$ on which the line $d$ is looped when the same is placed in its set position; that is, the flag end of the holder is towards the lower portion of the support, as indicated in Fig. 1 at $j^1$.

In order to rotatably support the flag-holder $g$ in the standard $a$ at the enlarged portion $f$, the intermediate end of the flag-holder is suitably twisted so as to form two pivot portions $k$, $k$ that can be readily sprung into the openings $m$ when mounting the same. Intermediate the pivotal portions $k$, $k$, of the flag-holder $g$ is also formed a loop or eye $n$ which is for the purpose of receiving the upper end of the operating and controlling spring $h$, the lower end of the spring being adjustably held in the standard $a$ by means of the removable pin $o$ that is slipped through the eye $p$ of the spring $h$ so that the tension of the spring can be readily varied, the dotted lines $o^1$ indicating the openings in which the pin $o$ can be placed for adjustably retaining the spring $h$. The location of the loop $n$ is normally out of the center line of the support $a$ so that the spring, by reason of its tension, will hold the flag-holder rigid in either an elevated or turned-down position, that is, in a position that will permit the flag-holder to rotate from one position to another as will be fully described.

Fig. 1 shows the position of the parts when the type is set and Fig. 4 shows the position of the parts after the type has been tripped, it being understood that the pull on the line $d$ after the bait has been seized is sufficient to rotate the flag-holder and carry the loop or eye $n$ so that the same will lie on the opposite side of the center line of the flag-holder. The spring $h$, at the instant that the loop or eye $n$ passes the center line, will then quickly act to throw the flag end of the holder $g$ to the elevated position, and the hook portion $i$ downward, as indicated in Figs. 4 and 5. The line $d$, which is looped as shown at $d^1$ over the hook portion $i$, when the type is set can then freely slip off the part $q$ of the hook portion $i$ thus permitting the line to freely unreel from the spool $r$, as readily understood. The flag-holder $g$ is looped at its upper end, as shown at $s$, the free end of the wire being carried around the body portion of the flag-holder, as shown at $t$. Within this loop $s$ is supported the signal or flag $u$. The reel $r$ is preferably made detachable on the standard $a$ in any suitable manner and it is not deemed necessary to describe the means herein employed.

What I claim, is:—

1. In a device of the class described, a standard provided with an opening therein, a rotatable element mounted within said opening, one end of the rotatable element being provided with a suitable signal and the other end being bent into a hook-shape, whereby when the hook-shaped end of the rotatable element is in an elevated position, the line can be supported thereon, and when the hook-shaped part of the rotatable element is in a lowered position, the line will be readily disengaged therefrom; and elastic means for retaining the rotatable element in either an elevated or lowered position.

2. In a device of the class described, a standard provided with an elongated opening therein, one portion of the opening being of greater width than the remaining portion of the opening, a flag-holder rotatably mounted on the enlarged portion of the elongated opening, an eye also formed in the flag-holder, an elastic element having one end secured to the eye and the other end to the standard, the eye portion being outside of the center line of the flag-staff in either a raised or lowered position whereby the flag-holder is yieldingly retained against rotation.

3. A device of the class described, a standard, a signal device rotatably mounted in the standard and provided with a bent portion at one end for receiving the signal proper, the opposite end of the signal device being provided with a hook-shaped part, elastic means on the standard and connected eccentrically to the pivot portion of the signal device for holding the signal device in an elevated or lower position, a reel carried by the standard for supporting the line, whereby when the line is looped over the hook-shaped part and a suitable tension is exerted thereon, the signal device will be tripped as described

CHARLES S. RUGGLES.

Witnesses:
 HENRY A. CHAPIN,
 H. W. BOWEN.